G. SCHNITZER.
MANUFACTURE OF CREAM OF TARTAR.

No. 183,597.             Patented Oct. 24, 1876.

Attest:
Edwin B. Williamson.
John Davis.

Inventor:
Guido Schnitzer
by G. Frelinghuysen
atty

UNITED STATES PATENT OFFICE.

GUIDO SCHNITZER, OF SCHWÄBISCH HALL, GERMANY, ASSIGNOR TO JULIUS W. HAAS, OF DUBUQUE, IOWA.

IMPROVEMENT IN MANUFACTURE OF CREAM OF TARTAR.

Specification forming part of Letters Patent No. 183,597, dated October 24, 1876; application filed June 20, 1876.

*To all whom it may concern:*

Be it known that I, GUIDO SCHNITZER, of Schwäbisch Hall, in the kingdom of Würtemberg, Germany, have invented a new and useful process in the manufacture of bitartrate of potash, popularly known as "Cream of Tartar;" and do hereby declare that the following is a full, clear, and exact description thereof, reference being had to the accompanying drawings, making a part of this specification.

Figure 1:
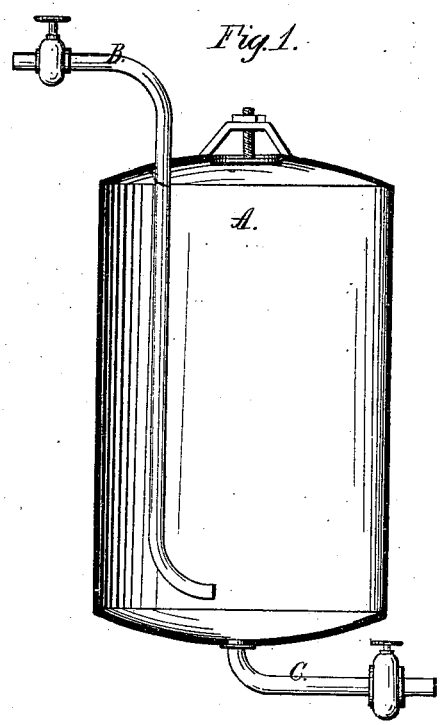
Figure 2:
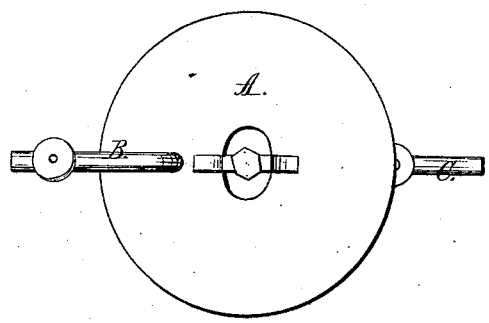

Figure 1 represents a vertical section of the copper or copper-lined cylinder used in the process, with steam and exhaust pipes. Fig. 2 represents a transverse section thereof, and shows the top and man-hole.

I use in my process a copper or copper-lined cylinder, placed and maintained in an upright position. (Seen in Fig. 1.) This cylinder may be of any size, but I prefer that it should be about four and a half ($4\frac{1}{2}$) feet in diameter, by six and a half ($6\frac{1}{2}$) feet in height. At the top of this cylinder is a man-hole, of sufficient size to allow easy ingress and egress. The man-hole plate must be so fastened as to be able to sustain the requisite pressure to be maintained in the boiler, and to be steam-tight.

A steam-pipe, B, Fig. 1, leading from a steam-boiler, passes into the cylinder. From the bottom of the cylinder or boiler another pipe, C, Fig. 1, extends, for the purpose of removing any insoluble or foreign matter that may settle after the crystallization of the cream of tartar has taken place.

The advantages and merits of my process over any and all others now known or used are, that by my process a much larger percentage or proportion of the argols can be and are dissolved, the crystals obtained are larger and finer, the product of the cream of tartar is greater and chemically pure, and all further treatment for the removal of impurities is rendered unnecessary, thus supplying a perfectly pure bitartrate of potassa at a much less cost than ordinary cream of tartar.

By all other methods of manufacturing bitartrate of potassa a certain amount of tartrate of lime is contained in the product and left in the residuum.

Having described the apparatus and some of the advantages of my process, I will now proceed to describe my process more fully.

An amount of water, sufficient to dissolve the argols to be used, is first placed in the cylinder A, to which are added the requisite equivalents of hydrochloric acid (HCl) of requisite gravity, and chloride of potassium, and ground argols, the quantity of the latter depending on the size of the cylinder A.

I prefer to add about a thousand (1000) pounds of argols in a cylinder of the size above given. The cylinder is then closed, so as to be steam-tight, and steam of the requisite pressure is admitted through pipe B, Fig. 1, and so maintained for about three (3) hours, more or less.

The steam supply being turned off, the cylinder and contents are allowed to remain till the crystallization of the bitartrate of potassa is complete, which usually takes about three (3) days. The crystals of bitartrate of potassa deposited in the cylinder are then removed through the man-hole, shown in Fig. 2. Then the "mother-water" is drawn off by means of a siphon, or otherwise, into another vessel, as A, Fig. 1. If this mother-water is not sufficient to dissolve the new charge of argols, the necessary amount of water is to be added. Thus all undissolved tartrate of lime, and uncrystallized bitartrate of potassa, are saved and utilized. The insoluble and foreign matter deposited at the bottom of the cylinder A may now be removed by means of pipe C, Fig. 1, or otherwise.

By adding the necessary amount of animal charcoal and pipe-clay, all coloring matter will be removed from the bitartrate of potassa, making the product chemically pure.

It will be noticed that this process differs essentially from those hitherto employed, in that I do not effect the solution of the argols by ordinary boiling nor by heating by means of a steam-jacket. By either of these methods a much longer time is required to effect the solution of the argols, and the chemical changes.

What I claim as my invention, and desire to secure by Letters Patent of the United States of America, is—

The process herein described of manufacturing cream of tartar by subjecting ground argols, together with hydrochloric acid and chloride of potassium and water, in a steam-tight vessel to the direct action of compressed or superheated steam for the necessary length of time, and then allowing the solution to stand till the crystallization of the bitartrate of potassa is complete, substantially in the manner specified.

GUIDO SCHNITZER.

Witnesses:
KARL FEICHMANN, *Professor.*
ADOLF KOPFF, *Professor.*